(12) United States Patent
Luttrull

(10) Patent No.: US 8,887,433 B2
(45) Date of Patent: Nov. 18, 2014

(54) DECOY SPREADER

(76) Inventor: Carl L Luttrull, Muscatine, IA (US)

( * ) Notice: Subject to any disclaimer, the term of this patent is extended or adjusted under 35 U.S.C. 154(b) by 299 days.

(21) Appl. No.: 13/229,039

(22) Filed: Sep. 9, 2011

(65) Prior Publication Data

US 2012/0066951 A1 Mar. 22, 2012

Related U.S. Application Data

(60) Provisional application No. 61/383,518, filed on Sep. 16, 2010.

(51) Int. Cl.
*A01M 31/06* (2006.01)

(52) U.S. Cl.
CPC ................................... *A01M 31/06* (2013.01)
USPC ........................................................ 43/2; 43/3

(58) Field of Classification Search
USPC ............... 43/3, 2; 135/15.1, 19.5, 20.3, 33.2, 135/37–42; 40/533, 530, 508, 509; 248/166, 167, 434, 435, 168, 171; 362/123; 428/20; 211/189, 195–197, 211/205
See application file for complete search history.

(56) References Cited

U.S. PATENT DOCUMENTS

| | | | | | |
|---|---|---|---|---|---|
| 694,732 | A | * | 3/1902 | Couon | 43/3 |
| 710,433 | A | * | 10/1902 | Coudon | 43/3 |
| 723,114 | A | * | 3/1903 | Witt | 211/205 |
| 755,043 | A | * | 3/1904 | Pike et al. | 248/171 |
| 843,712 | A | * | 2/1907 | Straub | 211/197 |
| 970,003 | A | * | 9/1910 | Wethall | 43/3 |
| 1,034,846 | A | * | 8/1912 | Thomas | 211/197 |
| 1,376,282 | A | * | 4/1921 | Kauffman | 43/3 |
| 1,590,220 | A | * | 6/1926 | Wurts | 211/197 |
| 1,629,442 | A | * | 5/1927 | Geisinger | 43/3 |
| 1,746,640 | A | * | 2/1930 | Emoff | 43/3 |
| 1,837,637 | A | * | 12/1931 | Walberg | 248/171 |
| 2,171,476 | A | * | 8/1939 | Katz | 135/33.2 |
| 2,246,574 | A | * | 6/1941 | Coe | 43/3 |
| 2,502,984 | A | * | 4/1950 | Parmenter | 135/33.2 |
| 2,545,800 | A | * | 3/1951 | Viken | 43/3 |
| 2,547,286 | A | * | 4/1951 | Sabin | 43/3 |
| 2,616,200 | A | * | 11/1952 | Milam | 43/3 |
| 2,624,144 | A | * | 1/1953 | Beverman | 43/3 |
| 2,952,090 | A | * | 9/1960 | Pittenger | 43/3 |
| 3,732,879 | A | * | 5/1973 | Okuda | 135/15.1 |
| 3,846,213 | A | * | 11/1974 | Thiemann | 428/20 |
| 3,970,834 | A | * | 7/1976 | Smith | 362/123 |
| 4,120,110 | A | * | 10/1978 | Aeschliman | 43/3 |
| 4,141,167 | A | * | 2/1979 | Muehl | 43/3 |
| 4,223,860 | A | * | 9/1980 | Prest | 248/171 |
| 4,535,560 | A | * | 8/1985 | O'Neil | 43/3 |
| 4,659,597 | A | * | 4/1987 | Lau | 211/196 |
| 4,660,313 | A | * | 4/1987 | Bauernfeind et al. | 43/3 |
| 4,847,123 | A | * | 7/1989 | Armstead et al. | 211/197 |
| 5,074,071 | A | * | 12/1991 | Dunne | 43/3 |
| 5,106,661 | A | * | 4/1992 | Pitts, Sr. | 428/20 |
| 5,400,996 | A | * | 3/1995 | Drish | 248/171 |
| 5,494,065 | A | * | 2/1996 | Kuo et al. | 135/37 |

(Continued)

*Primary Examiner* — Darren W Ark
(74) *Attorney, Agent, or Firm* — Simmons Perrine Moyer Bergman PLC

(57) ABSTRACT

The invention includes a decoy spreader having a central rod with a plurality of arms jointly connected to the central spine. Each arm, and at a plurality of locations on the central rod has at least one decoy attachment location. Preferably, there are at least ten decoy attachment locations. An extender mechanism may be used to help extend the arms or to retract the arms.

14 Claims, 4 Drawing Sheets

(56) References Cited

U.S. PATENT DOCUMENTS

| | | | |
|---|---|---|---|
| 5,505,221 A * | 4/1996 | Gao | 135/20.1 |
| 5,551,465 A * | 9/1996 | Steiner | 135/20.3 |
| 5,640,984 A * | 6/1997 | Dubunsky | 135/33.2 |
| 6,244,283 B1 * | 6/2001 | Ou | 135/15.1 |
| 6,296,005 B1 * | 10/2001 | Williams et al. | 43/2 |
| 6,302,125 B1 * | 10/2001 | Lin et al. | 135/33.2 |
| 6,385,895 B1 * | 5/2002 | Scaries | 43/2 |
| 6,470,620 B1 * | 10/2002 | Acker | 43/3 |
| 6,481,147 B2 * | 11/2002 | Lindaman | 43/2 |
| 6,626,199 B2 * | 9/2003 | Lin et al. | 135/41 |
| 6,655,071 B2 * | 12/2003 | Barnes et al. | 43/3 |
| 7,043,865 B1 * | 5/2006 | Crowe | 43/3 |
| 7,267,852 B1 * | 9/2007 | Rosado et al. | 428/20 |
| 7,311,110 B2 * | 12/2007 | Wu | 135/40 |
| 7,828,003 B2 * | 11/2010 | Montecucco | 135/20.1 |
| 2002/0104558 A1 * | 8/2002 | Kuo | 135/40 |
| 2003/0024146 A1 * | 2/2003 | Spady et al. | 43/3 |
| 2008/0121257 A1 * | 5/2008 | Zonsius | 135/19.5 |
| 2008/0301995 A1 * | 12/2008 | Brittingham et al. | 43/3 |
| 2009/0007946 A1 * | 1/2009 | Hsieh et al. | 135/20.3 |
| 2012/0160283 A1 * | 6/2012 | Lee, II | 135/20.3 |
| 2012/0266928 A1 * | 10/2012 | Lee, II | 135/20.3 |
| 2012/0324777 A1 * | 12/2012 | Smith | 43/2 |
| 2013/0014422 A1 * | 1/2013 | Bullerdick et al. | 43/3 |
| 2013/0104443 A1 * | 5/2013 | Cramer | 43/2 |
| 2014/0245652 A1 * | 9/2014 | Franklin | 43/2 |

* cited by examiner

DECOY SPREADER

CLAIM OF PRIORITY

This application claims the benefit of provisional application 61/383,518, filed on Sep. 16, 2010.

FIELD OF THE INVENTION

The present invention relates to improved methods and device for deploying and retracting large numbers of hunting decoys.

BACKGROUND OF THE INVENTION

The use of decoys in hunting water fowl is a time honored and proven technique to entice birds. Innumerable types of decoys have been used. However, all decoys suffer from the same basic problem; namely, they are difficult to deploy and retract. Deployed individually, decoys tend to bunch together because of wind and wave action or drift away as they are moved by wave action. Thus, a hunter can realistically maintain control over a few decoys at a time.

In the past, several solutions have been presented for deploying and retracting groups of decoys. For example, U.S. Pat. Nos. 2,246,574, 2,616,200, 2,624,144, 4,660,313, 5,074,071 and 6,655,071.

The time and effort needed to deploy and retract decoys becomes daunting as the number of decoys increases. Given that waterfowl hunting season is in the fall and winter, decreasing the amount of time spending deploying and retract decoys is highly desirable. However, use of a large numbers of decoys would be desirable in order to better attract waterfowl. In addition, storing numerous decoys is problematic because of the tendency of the decoys to become entangled with each other.

The present invention overcomes one or more of these problems.

SUMMARY OF THE INVENTION

The invention includes a decoy spreader having a plurality of decoy arms attached to a spine, with at least ten decoy attachment locations on the decoy arms and the spine, with a decoy attachment location on each decoy arm. The invention also includes a decoy spreader having a spine with a mainstay and a guide slidably connected to the mainstay. Here, at least three decoy arms are attached by pivot joints to the guide or mainstay of the spine. A constraint device is associated with each decoy arm. A plurality of decoy attachment locations are on the spine and the plurality of arms. A decoy line connects a decoy to the decoy spreader.

DETAILED DESCRIPTION

Figure 1:
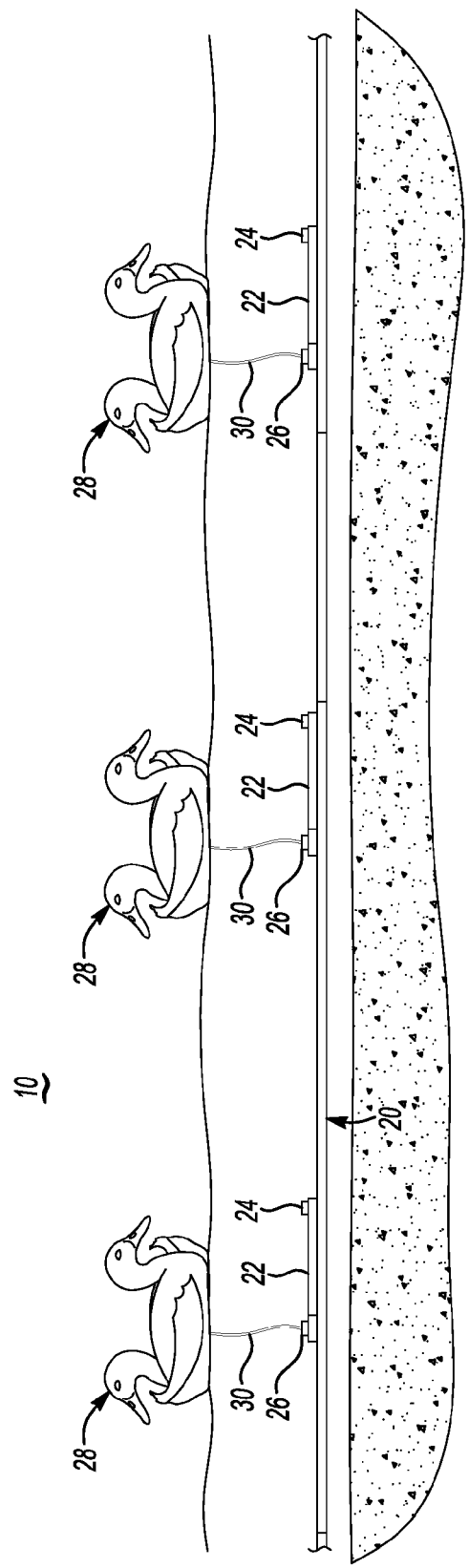
FIG. 1 shows a side view of a decoy spreader according to the present invention.
Figure 2:
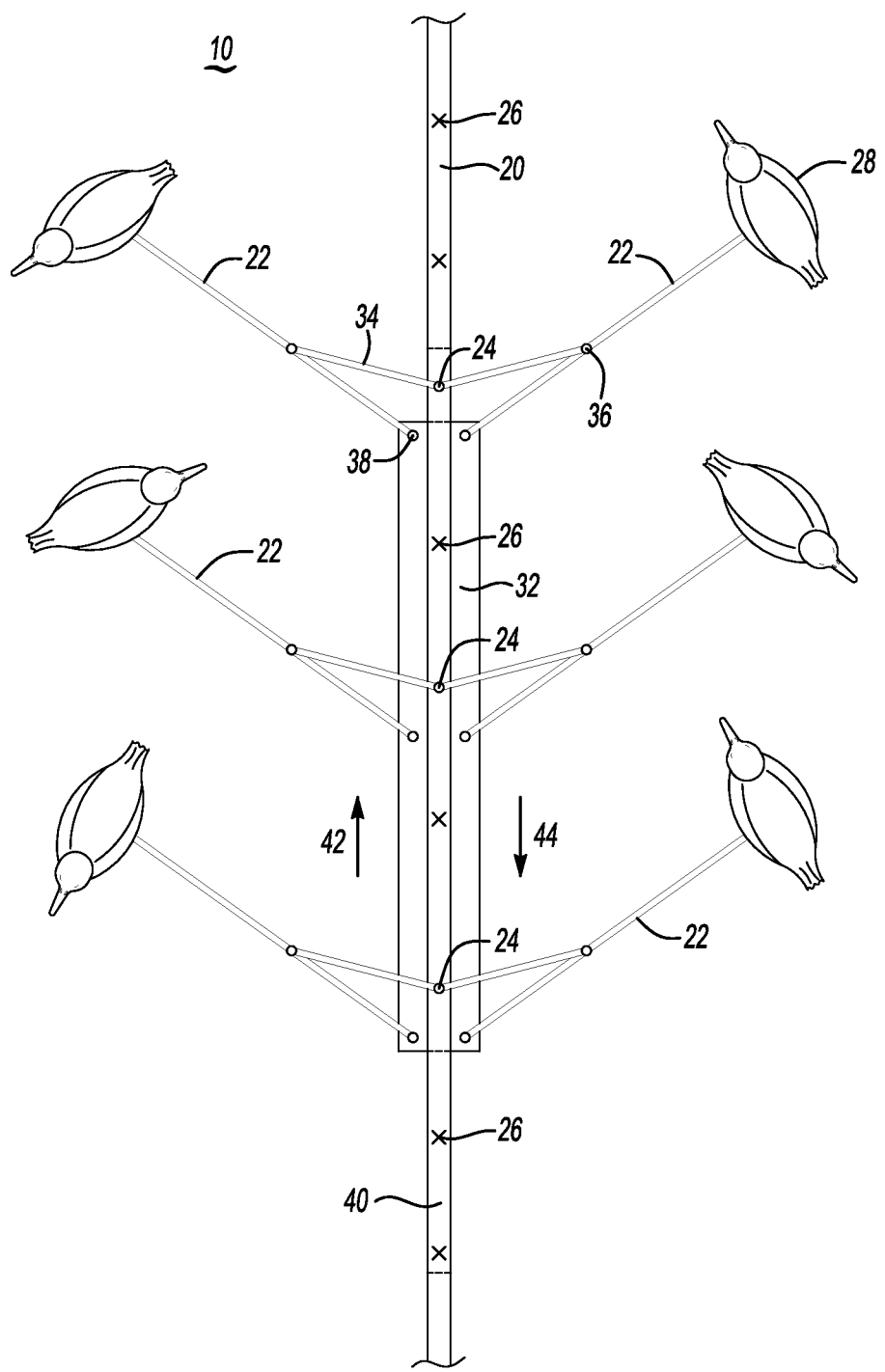
FIG. 2 shows a top view of a decoy spreader including an extender mechanism in a partially retracted arrangement or folded position.
Figure 3:
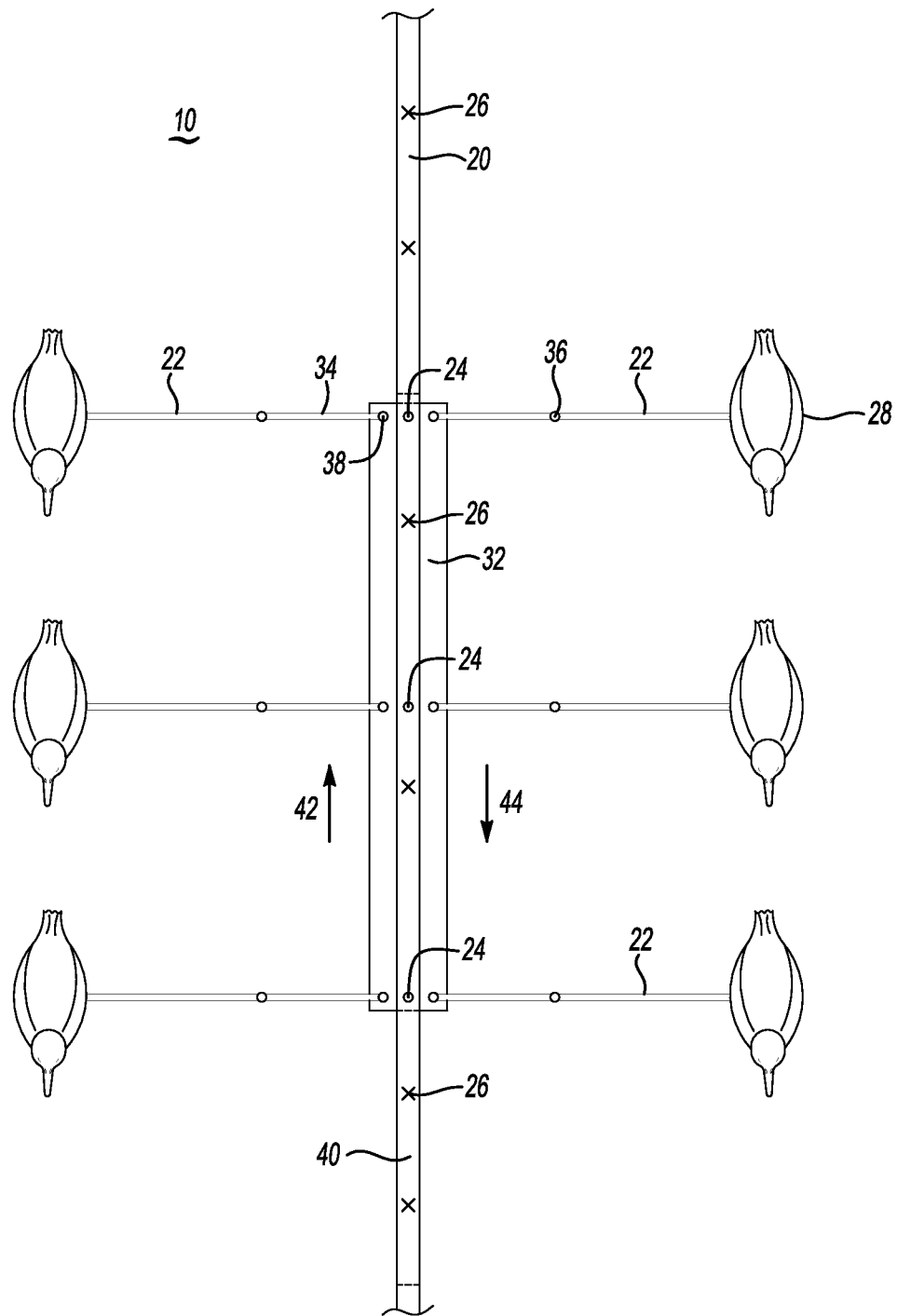
FIG. 3 shows a top view of a decoy spreader including an extender mechanism in a fully deployed position.

As seen in FIGS. 1-3, the decoy spreader 10 has a frame with a spine 20 and a plurality of decoy arms 22 connected to the spine at joints 24 or 38. A number of decoy attachment locations 26 are found on the spine and on arms. Decoys 28 are connected to the spreader 10 at attachment locations 26 by a decoy line 30.

The spine has a length generally greater than it width. For especially long spines, it may include one or more joints to enable the overall length of the spine to be shortened. For example, one or more end portions of the spine may be folded so as to be co-axially with the remainder of the spine or decoy arms. Shortening the spine in this manner will ease transportation and storage of the decoy spreader. The spine preferably includes a plurality of decoy attachment locations, where the locations may or may not be evenly spaced along the spine.

Each of a plurality of decoy arms 22 is attached to the spine with a pivotal joint 24. Located on each arm is at least one decoy attachment location 26. In one embodiment, each arm terminates at the spine as shown in FIG. 1. In this embodiment, preferably there are six arms, with four arms also contemplated. FIG. 2 shows this embodiment in the partially retracted or folded position. In another embodiment, each arm forms a crossbar with the central spine and includes a plurality of attachment locations. Preferably, there are at least two crossbar decoy arms in this embodiment, with three arms being more preferred. As with the spine, the arms may also be jointed to permit shortening of the arms for transportation and storage.

To improve the stability of the decoy arms when they are deployed, a connector arm may attach the decoy arm to the spine. For example, a hinged support may be used so that the connector arm is locked straight when the decoy arm is fully deployed. This is the preferred embodiment when an extender mechanism is not utilized.

In total, between the spine and the decoy arms, the decoy spreader has up to 15 attachment locations. Preferably, the decoy spreader has 6, 7, 8, 9, 10, 11, 12, 13, 14 or 15 attachment locations. In a more preferred embodiment, between the spine and the decoy arms, there are at least ten decoy attachment locations. By having at least ten decoys on a spreader, the amount of time needed to deploy and retract decoys is reduced significantly. Which, in turn, means less preparation time and more time hunting; this is especially important in cold weather.

The material of the spine and decoy arms is preferably light, strong and corrosion resistant such as metal, plastic or wood. Exemplary material include aluminum angle. In a preferred embodiment, the total weight of the spreader is supportable by the buoyancy provided by the number of decoys connected to the spreader. In this manner, the decoys will sit atop of the water and move in a nature fashion. In the alternative, the spreader may include a buoyancy increasing material or be made from a buoyant material. Here, the decoy line may include more slack to thus permit more movement of the decoy after deployment. In this embodiment, an anchor may be utilized to keep the decoy spreader from drifting.

The decoy attachment locations may be simply a hole through the arm or spine through which the decoy line is threaded and/or tied. In the alternative, other fastening techniques may be used to connect the decoy to the decoy arm, such an eye bolt, carabiner, a D-ring or snap fit attachment devices. These are preferable because decoys can be switched in and out easily from the decoy spreader and will decrease the problems associated with tangling of the decoys. While not preferred, the decoys may be attached directly at the attachment locations. Such an arrangement would guarantee that the decoys remain separated; however, it would not permit the decoys to move with the wind and waves and may not be lifelike. An attachment means includes a through hole in the decoy arm or spine or any other fastener such an eye bolt, a carabiner, a D-ring or a snap fit attachment device and may or may include a decoy line.

The decoy line between the decoy spreader and the decoy may be a material of any stiffness; from a flaccid nylon rope to a rod that is flexibly connected to spreader and/or the decoy. The decoy line may be a fixed length or an adjustable length.

In the fixed length embodiment, each decoy is attached to the attachment location with a given length of decoy line and it is preferable that the length is the same for each decoy. In this way, the weight of the spine and decoys is evenly distributed amongst all of the decoys. Of course, it preferred that the given length of decoy line is such that neighboring decoys do not become entangled after deployment, as this would interfere with easy retraction of the spreader. However, different lengths of line for each decoy are also contemplated. In fixed length line embodiment, the decoys are typically attached before or at the time of deployment, such as through the use of leash clips or carabiners. The decoy line may be temporarily or permanently affixed to the attachment location on the decoy spreader, or temporarily or permanently attached to the decoy, or any combination thereof.

Figure 5:
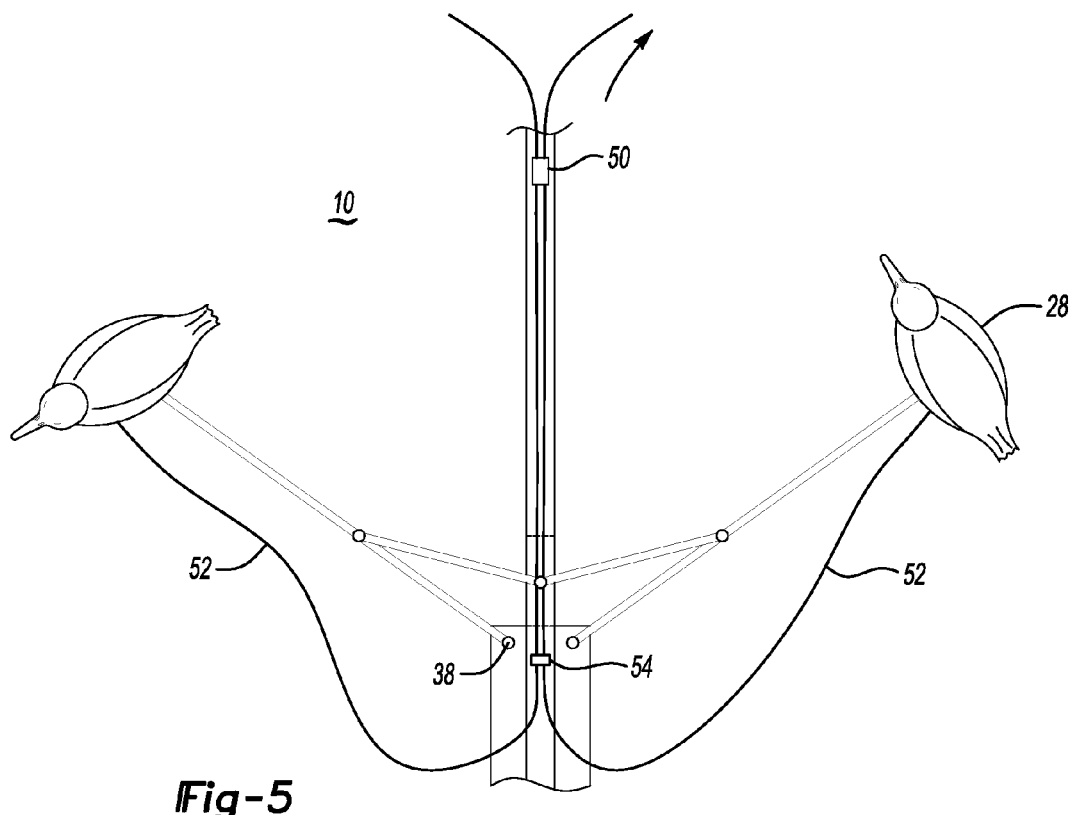
FIG. 5 shows a hold mechanism, adjustable length decoy lines and additional guides.

In one embodiment of the adjustable length decoy line, the line is temporarily or permanently affixed to the decoy and then threaded through the attachment location to a gathering location. The gathering location serves to temporarily hold one or more of the decoy lines at a specific length. In this manner, individual decoys can be played out or reeled in. The gathering location may be on the spine or separate from the spine. Preferably, the gathering location includes a holding mechanism, such as a clamp or cleat, to hold the decoy lines at a desired position. As seen in FIG. 5, when decoy spreader is deployed, the holding mechanism 50 can be utilized to select the amount of movement (or play) the decoys are allowed. Moreover, the adjustable decoy line length 52 permits the decoys to be retracted tight to the spine and arms during retraction of the decoy spreader. This makes the decoy spreader easier to stow and easier to deploy. In one embodiment, the decoy lines are passed through additional guides 54 (e.g. through holes, eye bolts, pulleys or D-rings) located along the arms and spine so as to reduce the chances that the decoy lines will tangle or snag during stowing, deployment or use.

The joints, whether attaching the arms to the spine, in the arm or in the spine, are preferably lockable so that the jointed pieces remain in a fixed position to each other. This insures that the distance between the decoys remains fixed while the decoys are deployed, but enable the decoy spreader to be folded for transportation and storage.

In one embodiment, the spine further comprises an extender mechanism to deploy the decoy arms from the folded position or to retract the arms to the folded position. The extender mechanism may be similar to that used in an umbrella. For example, a guide 32 is slidably connected to a mainstay of the spine, where the guide actuates the joints to move the decoy arms from the folded position to the extended position or vice versus. In one embodiment, the guide slides in a track that runs a length of the mainstay of the spine. An extender means includes any combination of guide and track that deploys or retracts the decoy arms.

In one embodiment utilizing a guide, connector arms 34 are also utilized to provide lateral support to the decoy arms and to constrain the decoys arms so that the decoy arms deploy and retract when the guide is moved (as discussed below). The connector arm may connect to the decoy arm at a fixed, but pivotable location. In the alternative, the connector arm may by slidably connected to the decoy arm, so that connection location slides up and down the decoy arm as the spreader is deployed or retracted. Of course, a combination slidably and pivotable connection between the connector arm and the decoy is contemplated.

In another embodiment, the connecter arms are dispensed with. For examples, through hole in the wall of the mainstay may be utilized. That is, the decoy arm is threaded through the through hole and pivotally attached to the guide. Given the limited size of the through hole and pivot attachment to the guide, the decoy arms will move when the guide is moved along the length of the mainstay. In the alternative, a pair of stops located on the mainstay and either side of a decoy arm, obstructs the movement of the decoy arm as the guide is moved, causing the decoy arms to deploy and retract. Thus, the connector arm, the through hole in the mainstay wall and a set of stops may act as constraint devices and provide the function of constraining the movement of the decoy arms.

In another embodiment, the extender mechanism includes an energy storage device (e.g. a spring) that provides the energy to deploy or retract the decoy arms (or spine). Releasing the energy may cause the decoy arms (or spine) to retract or to merely permit the arms to be manually folded. The opposite may also be utilized; that is, loading the energy storage device causes the decoy arms (or spine) to retract and releasing the energy causes the arms deploy. In one embodiment, pulling on the adjustable length decoy lines energizes the storage device.

The decoy spreader and preferably the extender mechanism may include a locking mechanism to prevent the guide from unintentionally deploying or retracting the decoy spreader or for holding the decoy arms at a specific position that is different from either fully deployed or fully retracted. In the alternative, the locking mechanism may be located on the spine; e.g. on the mainstay or one or more of the decoy arms.

Figure 4:
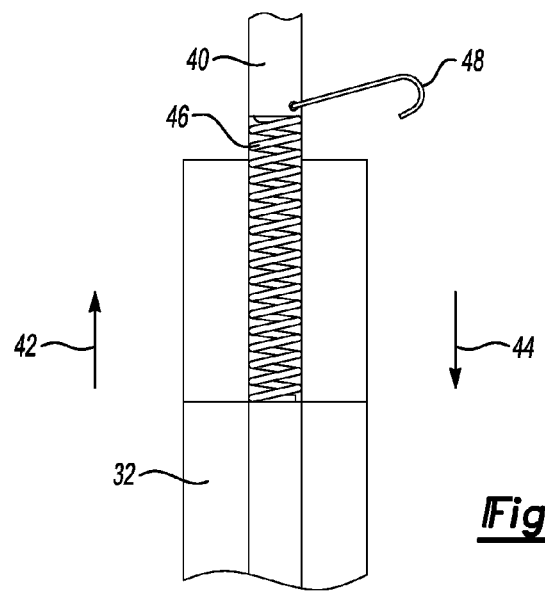
FIG. 4 shows an energy storage device and locking mechanism.

The energy storage device 46 and locking mechanism 48, as seen in FIG. 4, may be useful in embodiments of the extender mechanism where the decoy spreader self-deploys or self-retracts. For example, the guide is actuated to load the energy storage device and then locked into place. Upon releasing the locking mechanism, the stored energy is released and the decoy spreader deploys or retracts, as the case maybe. Such an embodiment would provide additional means to rapidly deploy and/or retract the decoys. In one embodiment, one or more of the decoy lines are used to actuate the guide or to load the energy storage device. For example, pulling on the decoy lines causes the decoy spreader to retract and loads the energy storage device. Here, the gathering location may act as the locking mechanism for the extender mechanism or a holding mechanism for the adjustable length decoy lines or anchor lines (as discussed below).

In another embodiment, one or more energy storage devices may be used so that both deployment and retraction are fully or partially accomplished by releasing energy from the storage device(s).

As seen in FIGS. 2 and 3, the decoy spreader includes an extender mechanism. The extender mechanism include a guide 32 slidably connected to the mainstay 40 of the spine 20; for example in a track on or in the spine. Each of the plurality of arms 22 is connected to the guide with a joint 38 that permits rotation in the plane of the decoy spreader; e.g. a pivot joint. Furthermore, the each of the decoy arms is connected to the mainstay with a connector arm 34 with joints 24, 36 that permit rotation in the plane of the decoy spreader; e.g. a pivot joint. The connector arm is generally rigid and may be made of the same material as the spine and/or the decoy arms. The opposite arrangement is also possible; that is, the decoy arms are connected to the mainstay and the connector arms are connected to the guide. Furthermore, a combination arrangement is also possible, with some of the decoy arms connected to the guide and some connected to the mainstay. In this arrangement, the connector arm associated with each decoy arm is connected to then piece other than what the decoy arm is attached to. That is, if the decoy arm is connected to the mainstay then the connector arm is connected to the guide. FIG. 2 shows the decoy spreader in a partially deployed position and FIG. 3 shows the decoy spreader in the fully deployed position.

An embodiment with six decoy arms is shown in FIGS. 2 and 3. An embodiment with three decoy arms is also contemplated. Such an embodiment benefits from having half the number of decoy arms and connector arms. The less complex arrange has the decoy arms connected to the mainstay of the spine and the connector arms connected to the guide. Typically all of the connection points of the decoy arms on the mainstay would be on the same side of the guide in this embodiment. Again, the opposite arrangement is also possible; that is, the decoy arms are connected to the guide and the connector arms are connected to the mainstay. Furthermore, a combination arrangement is also possible, with some of the decoy arms connected to the guide and some connected to the mainstay.

For the embodiments shown in FIGS. 2 and 3, the decoy spreader 10 is deployed by sliding the guide 32 in the direction of arrow 42. This motion causes the decoy arms to splay away from the spine and to cause the decoy attachment locations on the decoy arms to move away from the spine, thus spreading the decoys. The decoy spreader is retracted by sliding the guide 32 in the direction of arrow 44.

In the embodiment having the opposite arrangement of connections for the decoy arms and connector arms, the decoy spreader is deployed by sliding the guide toward the point where the connector arm attaches the decoy arm to the guide. This motion causes the decoy arms to splay away from the spine and to cause the decoy attachment locations on the decoy arms to move away from the spine.

To help insure that spine or decoy arms do not accidentally deploy during storage or travel, a variety of techniques may be used to temporarily hold the decoy arms in place. For example, strapping (e.g. hook-and-loop fasteners) may be used to hold the decoy arms to the spine. In the alternative, the decoy arms may snap-fit to the spine.

The decoy spreader may also include one or more anchors attached to the spine or arms, where the anchor rests on the bottom and holds the decoy spreader in place. Similar to the decoy lines, the anchor maybe attached to the decoy spreader by a fixed length or adjustable length line. For the adjustable length line embodiment, the line may be treated as a decoy line and routed through additional guides and/or to the gathering location.

In one embodiment, the decoy spreader may have a modular design such that a plurality of spreaders could be connected together to form ever larger deployments of decoys. The modular design may include spines or arms that connect to one another with snap-fit fasteners or by lengths of line.

As used in the application, 'deploy' and 'retract' and related words are used to indicate both fully completing the task as well to indicate partial completion of the task. For example, deploy the decoy arms includes everything from moving the arms from the fully retracted position to the fully deployed position.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A decoy spreader comprising:
    a guide, wherein the guide is slidably connected to a spine;
    a plurality of decoy arms attached to the guide at a plurality of guide pivot joints, wherein the guide pivot joints are separated from each other along a length of the guide; and
    at least ten decoy attachment locations on the plurality of arms and the spine, with at least one of the decoy attachment locations on each of the decoy arms,
    wherein each of the decoy arms is connected to the guide at one of the guide pivot joints and wherein the decoy arms are connected to a mainstay of the spine by a connector arm by a connector arm pivot joint on the mainstay and an other connector arm pivot joint on the respective decoy arm.

2. The decoy spreader of claim 1 wherein the plurality of decoy arms number at least three.

3. The decoy spreader of claim 2 wherein the plurality of decoy arms number at least six.

4. The decoy spreader of claim 2 further comprising at least one decoy line attached to each of the attachment locations, wherein the decoy lines are fixed length decoy lines, adjustable length decoy lines, or combinations thereof.

5. The decoy spreader of claim 4 further comprising an energy storage device and a locking mechanism.

6. The decoy spreader of claim 5, wherein the energy storage device facilitates a deployment of the decoy arms or the spine, a retraction of the decoy arms or the spine, or both the deployment and retraction.

7. The decoy spreader of claim 4 wherein the decoy lines include a plurality of adjustable length decoy lines, wherein the adjustable length decoy lines are threaded through one or more additional guides, and gathered together at a gathering location.

8. The decoy spreader of claim 7 wherein the gathering location is located on the spine and includes a holding mechanism.

9. The decoy spreader of claim 8 further comprising an energy storage device and wherein actuating the adjustable length decoy lines store or release energy from the energy storage device.

10. A decoy spreader comprising:
a spine having a mainstay and a guide slidably connected to the mainstay;
at least three decoy arms attached by guide pivot joints to the guide of the spine, wherein the guide pivot joints are separated from each other along a length of the guide;
at least one connector arm attached to each of the at least three decoy arms at a spine pivot joint, and wherein each of the connector arms is also attached to the mainstay at a mainstay pivot joint;
a plurality of decoy attachment locations on the spine and the plurality of decoy arms, with at least one decoy attachment location on each of the decoy arms; and
at least one decoy attachment line for each one of the plurality of decoy attachment locations.

11. The decoy spreader of claim 10 wherein at least one of the decoy lines is an adjustable length decoy line.

12. The decoy spreader of claim 11 wherein adjusting the length of one or more of the adjustable length decoy lines deploys or retracts the decoy arms or spine.

13. The decoy spreader of claim 11 further comprising an energy storage device and wherein adjusting the length of one or more of the adjustable length decoy lines stores energy in the energy storage device.

14. The decoy spreader of claim 10 wherein the plurality of decoy attachment locations comprises at least ten decoy attachment locations.

* * * * *